United States Patent [19]
Moriyama et al.

[11] 3,825,941
[45] July 23, 1974

[54] RELEASE SWITCH DEVICE FOR A CAMERA

[75] Inventors: Inao Moriyama, Sagamihara; Masamichi Toyama, Tokyo, both of Japan

[73] Assignee: Canon Kabushiki Kaisha, Tokyo, Japan

[22] Filed: Feb. 22, 1973

[21] Appl. No.: 334,900

[30] Foreign Application Priority Data
Feb. 28, 1972 Japan.............................. 47-24263
Feb. 28, 1972 Japan.............................. 47-24264

[52] U.S. Cl................ 354/266, 200/67 D, 352/178
[51] Int. Cl...................... G03b 19/18, G03b 17/38
[58] Field of Search.......... 95/11 R, 11.5 R, 31 EL, 95/10 C; 352/174, 178, 169; 200/7, 160, 67 D

[56] References Cited
UNITED STATES PATENTS
2,313,341  3/1943  Holmes........................... 200/67 D
3,165,037  1/1965  Neudecker et al. ............ 352/174 X
3,186,319  6/1965  Hochstein...................... 352/178 X
3,246,944  4/1966  Winkler............................ 352/91 S
3,535,991  10/1970  Kiyoshi Kitai........................ 95/11 R
3,603,228  9/1971  Kremp et al. ..................... 95/11 R
3,668,989  6/1972  Winkler et al................ 95/31 EL X Primary Examiner—Samuel S. Matthews
Assistant Examiner—Kenneth C. Hutchison
Attorney, Agent, or Firm—Flynn & Frishauf

[57] ABSTRACT

The actuating member of a shutter release mechanism first operates a first set of switches while its progressive motion charges an arcuate spring to a dead point at which it reverses the direction in which it urges a second set of switches. Upon passing the dead point, the arcuate spring operates the second set of switches. The first set of switches may set exposure factors, turn on a tape recorder, or turn on lighting, for example. The second set of switches releases the camera shutter and may perform other functions too.

6 Claims, 10 Drawing Figures

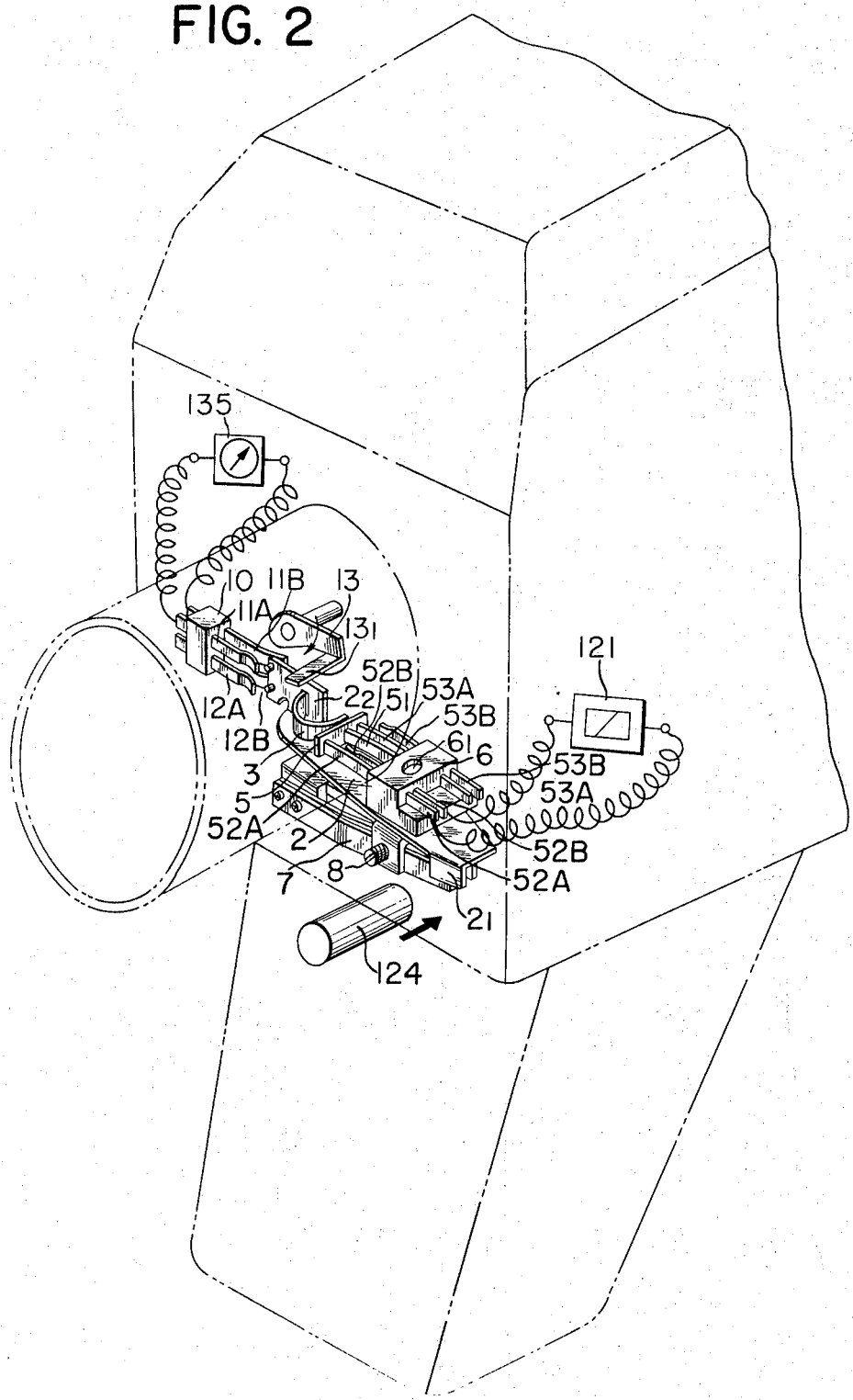

RELEASE SWITCH DEVICE FOR A CAMERA

BACKGROUND OF THE INVENTION

1. Field of the Invention

The invention is directed to the field of release switch devices for a camera and more particularly to a release switch device arranged to perform successive operations including, in sequence, operation of camera's shutter release.

2. Description of the Prior Art

In most cameras whether cinecameras or still cameras, space in the case is so small that it is difficult to find space for power source batteries and the like, so that the batteries are necessarily small. Accordingly, it is preferable to switch in the power supply by a mechanism interlocking with the shutter release control of the camera, and to return the power supply switch to OFF condition with the return of the shutter release control or on some other event indicating completion of operation of the camera. Such an arrangement is a safeguard against battery drain during standby or storage periods.

For example, in German Pat. No. 1,245,713, a release switch device is disclosed in which a switch interlocking with the release operating member is used for closing an exposure meter which controls exposure elements such as stop means and the like. This switch is closed at a first stage of operation of the release control, and a power supply switch for a shutter actuating and film feeding motor is closed at a second stage of operation. In the switch construction there described, in which the switch is operated by a multi-stage stroke of the shutter release operating member, it is necessary that the switch be changed-over at the proper stage. When contact of the switch becomes dirty because of exposure and repeated use over a long time, the timing of the operation of the switch becomes uncertain. As the contact of switch becomes dirty, positive changing-over (into ON condition) may fail to be accomplished unless the resilient pressure of contact piece of the switch reaches a higher value than previously required, thus delaying the closure of the circuit and sometimes failing altogether to close it, depending on the degree of dirt accumulation.

It is therefore an object of this invention to eliminate various disadvantages noted above with respect to prior art devices.

SUMMARY OF THE INVENTION

It is a further object of this invention to provide a release switch device for a camera in which one switch element operates first and another switch element which operates with delay is actuated by a spring that first passes through a dead point of the spring force at which one direction component of spring force goes through reversal, whereby changing-over of the switch elements can accurately take place in the desired sequence.

It is another object of this invention to provide a release switch device for a camera in which the switch element for a multi-stage switch which operates with delay is provided with resilient means which gives said switch element the changing-over resilient force with a dead point as the boundary, and the said switch element is held in the changed-over condition by return resilient means which acts against the first mentioned resilient means.

Other objects will appear in the following embodiments, which will be described with reference to drawings.

BRIEF DESCRIPTION OF THE DRAWINGS

FIG. 2 is a perspective view of one embodiment of a switch device according to the invention as used in the camera shown in FIG. 1.

DESCRIPTION OF THE PREFERRED EMBODIMENTS

Figure 1:
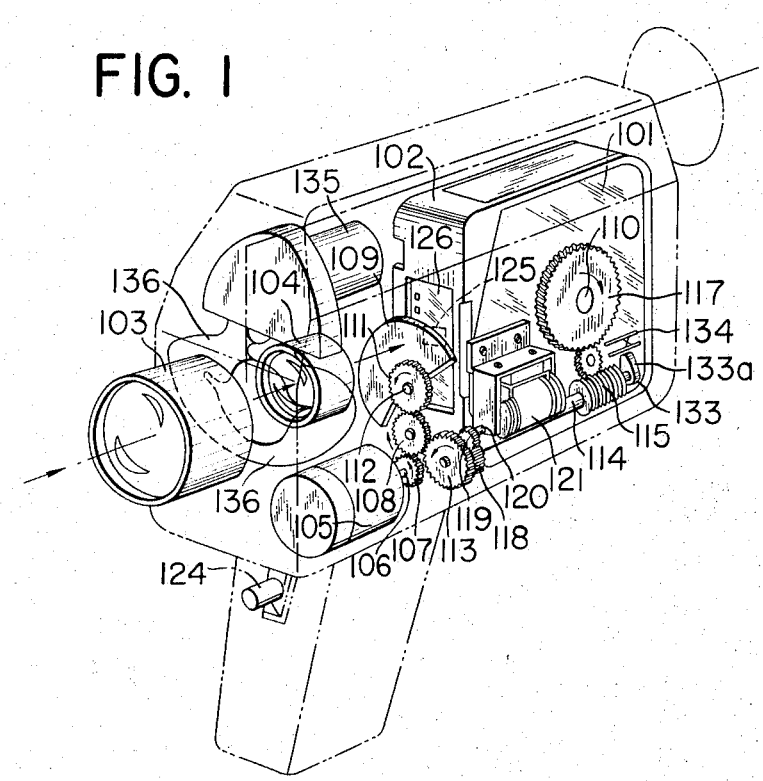
FIG. 1 is a perspective view of the disposition of the major parts of a cinecamera to which a release switch device according to the invention is applied, with the housing shown in dot-dash lines.

FIG. 1 shows the construction of a cinecamera to which a release switch device according to the present invention is applied. In this drawing, the outline of the camera housing is shown by two-dotted lines, the reference numeral 101 indicating the housing generally. The reference numeral 102 designates a film magazine fitted in the housing a zoom lens 103 and a relay lens 104 together form a well-known optical system. A driving motor 105 is connected to a power source (not shown) and is so constructed that the driving force of the motor 105 is transmitted through a gear 107 mounted on a rotating shaft 106 of said motor and an intermediate shaft 108 meshed with said gear 107 so that a shutter 109 and a film take-up shaft 110 may be driven. The gear 108 is rotatably supported by the camera housing and transmits the driving force of the motor 105 to a gear 111 on the shutter shaft 108 to rotate the shutter 109. The shutter shaft 112 is also rotatably supported by the camera housing. A driving gear 113 is meshed with the intermediate gear 108 for rotating a drive shaft 114 at the same speed as the shutter. On the other end of the drive shaft 114 there is mounted a worm gear 115, which transmits the rotation of the shaft 114 through a worm wheel 116 to a film take-up gear 117, thus driving the film take-up shaft 110. In the figure, arrows show the direction of rotation of the respective transmission members when the motor 105 is rotated in the direction as indicated by the adjacent arrow. On the end portion of the shaft 114, where the gear 113 is mounted, there is mounted a cam 118 having a shape hereinafter described. A stopper 119 is detachably mounted on a sliding lever 120 to engage the cam 118. A solenoid 121 is carried on the sliding lever 120. When the shutter release button 124 is depressed, the camera is actuated to rotate the shutter 109 and to proceed to take a photograph, one frame or continuous photographing, which will be described in detail later. A path for light coming in is indicated by one-dotted lines. The light, which penetrates through the zoom lens, is divided into two beams by means of a light divider. One light beam travels straight ahead passing through the relay lens and exposes film 126 at area 125 as indicated by a broken line. The other light beam passes above the camera mechanism and reaches a finder.

An electromagnet release mechanism using a solenoid 121 may be used for the shutter release mechanism as disclosed, for example, in U.S. Pat. No. 3,597,061 and U.S. Pat. No. 3,603,678, so that the detailed description thereof is omitted. A stop blade 135, and a driving meter 136 are also shown in FIG. 1.

The release switch device according to this invention interlocked with the release button 124 shown in FIG. 1 is illustrated in FIG. 2.

In FIG. 2, the reference numeral 124 designates a release button for a camera shown in FIG. 1; 2 an operating lever slidably pivoted on shaft $6_1$; $2_1$ and $2_2$ bent portions thereof; 3 an arcuate spring plate (leaf spring) fitted in a slit made in the aforesaid bent portion $2_2$; 5 a switch actuating plate; $5_1$ a flat spring mounted on a switch base 6 to be secured to the fixed frame of camera; 52A and 53A flat spring electrodes aligned with said flat spring $5_1$ and embedded in said base 6; and electrodes 52B and 53B fixed electrodes mounted on the base 6 opposite to electrodes 52A and 53A, respectively, each electrode being embedded projecting rearwards of the base 6. The actuating plate 5 secures electrodes 52A and 53A and the end of the flat spring $5_1$, and is integrally displaced. On the other hand, the extremity of the flat spring $5_1$ penetrates the actuating plate 5 and is fitted into a slit made in the arcuate spring plate 3. The number 7 denotes a return spring having one end secured to the fixed frame provided under the base 6. 8 denotes a screw for adjusting the spring. The number 10 designates a base body for a first switch device with fixed electrode contact pieces 11A, 12A and movable contact pieces 11B, 12B embedded in the base body. The movable contact pieces 11B, 12B have their extremities resiliently rested on the bent portion $2_2$. A lock member 13 rotates in a clockwise direction from a position as interlocking with a release lock member not shown and protrudes into the path of the bent portion $2_2$ to lock said bent portion by means of the extremity of a bent portion $13_1$, and then rotates in a counter-clockwise direction with a signal of termination of shutter action so as then to disengage from the bent portion $2_2$. An EE circuit 135 determines the aperture provided by a stop blade 136 of the camera. The light receiving element, batteries, etc., of the circuit 135 are omitted for simplicity of illustration. An electromagnetic release device 121 functions to release a shutter.

Figure 3:
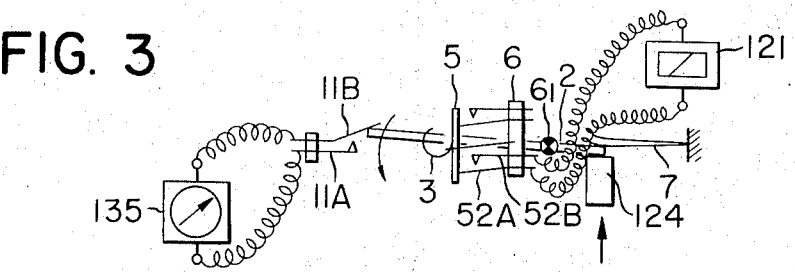
FIGS. 3 to 5 are diagrams each explaining an operation of the device shown in FIG. 2.
Figure 4:
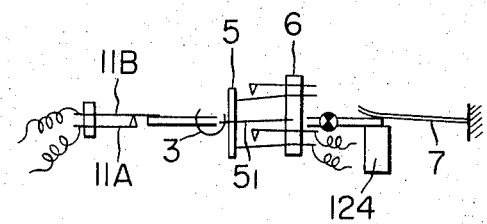
Figure 5:
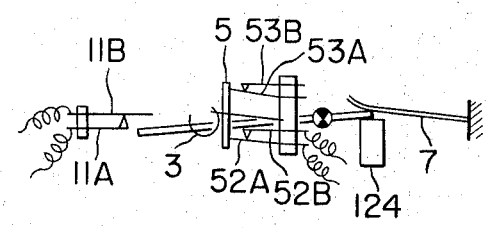

When the camers is directed at an object and the release member 124 is depressed, the bent portion $2_1$ of the operating lever 2 is pressed by one end of the release member 124 to cause the operating lever to be rotated in a counterclockwise direction as schematically shown in FIG. 3. As a result, the contact piece 11B is displaced by its resilient force, due to disengagement of the bent portion $2_2$ of lever 2, and is put in contact with the fixed contact piece 11A as shown in FIG. 4. Accordingly, the EE circuit 135 is closed so that an aperture stop of camera may be controlled by means of the stop blade 136. When the release member 124 is depressed further the arched spring plate 3 fitted in the lever 2 pushes up the extremity of the flat spring $5_1$ so that the movable contact electrodes 52A, 53A and fixed contact electrodes 52B, 53B are connected together as shown in FIG. 5 by means of the actuating plate 5. The arcuate spring plate 3 has its end held between the operating lever 2 and the actuating plate 5, being bent thereby and thus storing energy. Accordingly, when the operating lever 2 is rotated in a counter-clockwise direction by depressing the release button 126, the spring 3 is subjected to force in a direction of further bending at the initial stage, thus further accumulating the energy in the spring. Consequently, the resilient force is at first applied to the actuating plate 5 in a downward direction as shown in FIG. 3, that is, in a direction to disengage contact 52A with contact 52B. When the operating lever 2 is further depressed in a counter-clockwise direction, the spring 3 the direction of the force on the operating lever and the force on the flat spring $5_1$ come to lie on the same line, reaching a "dead point" of the spring 3. When the operating lever 2 is further rotated in a counter-clockwise direction, the spring 3 passes over its dead point and the changeover actuating plate 5 is urged upwards by means of the resilient force of the spring 3 to be repositioned upwards against the resilient force of the flat spring $5_1$. Consequently, contact of electrodes 52A, 52B and of 53A and 53B occurs. Accordingly, the electrodes 52A and 53A are put in contact with fixed contact electrodes 52B and 53B under the constant resilient force. Contacts 11A and 11B are closed by means of the extremity of the operating lever 2 before the contacts 52A and 53A are changed-over. Changing-over of switches 52A and 53A is delayed, however in the course of accumulation and release of energy by the spring 3. Therefore, during that time, the stop blade 136 has been set to have its aperture as required in the EE circuit 135. When contact electrodes 52A and 52B are closed, a driving current flows into the electromagnetic release device 15 from a power source (not shown) to actuate that device to open and close the shutter.

In FIG. 5, if the lock member 13 is inserted into the return path of the lever 2 by means of a lock button not shown, the lever 2 does not return even if the release button 124 1 is released, so that repeated photographing shots cannot be taken. If the lock member 13 is interlocked with the shutter mechanism, instead of manipulated by a lock button as described above, so as to set in a locked position while the shutter is open, the lever 2 can be returned after the shutter has been closed, to open the EE circuit 135 and the electromagnetic release circuit 121, making them inoperative.

Figure 6:
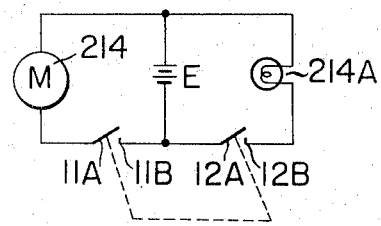
FIGS. 6 to 9 are circuit diagrams representing modified forms of the release switch device according to the invention.

FIG. 6 illustrates an embodiment in which there are provided, instead of the EE circuit in the aforesaid embodiment, a driving motor 214 for feeding a film or winding a shutter, a lamp 214A for checking the driving voltage, and switches 11A - 11B, 12A - 12B for operation as required. In case the driving power source voltage E is in excess of a predetermined value as the shutter release member 1 is depressed, the lamp 214A will go on and at the same time the motor 214 will be rotated to perform winding of the camera. Then, when the release member 1 is pushed completely down, the aforesaid electromagnetic release device 121 is actuated to release the shutter.

Figure 7:
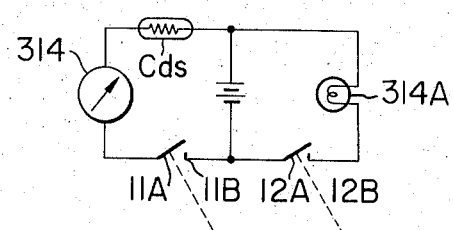

An embodiment shown in FIG. 7 is provided with an EE circuit comprising a meter 314, a light conductive CdS element for measuring brightness of an object, a power source $E_1$, and a lamp 314A to make sure that EE circuit may be operated by action of said switches 12A - 12B, this lamp indicating a positive operation of the EE circuit. In this case, the meter 314 has its needle directly connected to the stop blade, or else indirectly connected for control of the stop blade aperture by the angle of needle deviation in a known form of EE mechanism.

Figure 8:
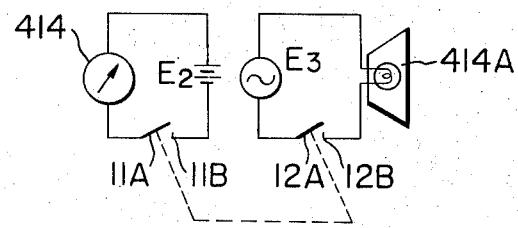

An embodiment shown in FIG. 8 has an illuminating lamp 414 to be energized by a commercial power source $E_3$, instead of the lamp 314A in the previous embodiment shown in FIG. 7, and the illuminating device is actuated at the same time as the actuation of the EE circuit.

Figure 9:
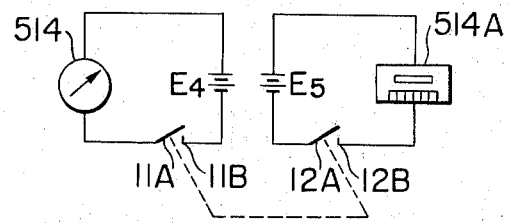

An embodiment shown in FIG. 9 has a tape recorder 514A connected in place of the lamp 314A in the embodiment shown in FIG. 7, and the tape recorder is started at the same time as the actuation of the EE circuit.

In the switch devices described above, before or after the release button is depressed, exposure factors such as apertures stop or shutter speed, etc., are first controlled and the shutter is then released, after the exposure system of the camera has come under complete control, to carry out a positive operation of the camera. When it is desired to record sound along with picture taking a tape recorder is started before releasing the camera to start picture taking. After the casptan or the like in the tape recorder has reached its required speed, and further elements which are to be controlled before the camera is started have been controlled, then the camera can accurately be controlled or started.

Figure 10:
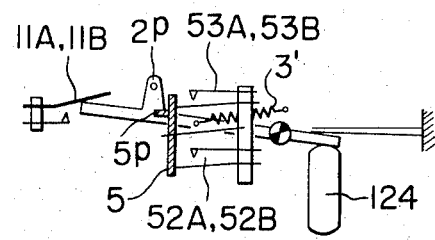
FIG. 10 is a diagram of another modified release switch device according to the invention.

In the foregoing embodiments, only the case has been described in which the arched spring 3, forming a part of the switch which operates with delay, is applied with force accumulated between the switch actuating plate and operating lever repositioned in interlocking with the release button 124. A similar effect, however, may also be obtained by the spring 3' merely suspending the operating lever, as shown in FIG. 10, which shows the device in the condition of accumulating force. Further, in this case, the actuating plate 5 is provided a projecting engaging portion 5p for performing changing-over by engagement with an engaging pin 2p for changing-over the switch operated with delay, so that the second switches 52A, 52B, 53A and 53B may be changed-over after the first switches 11A and 11B are changed-over.

The type of spring referred to herein as a plate spring is also known as a leaf spring and, if flat, as a flat spring.

As is clear from the foregoing, the present invention provides a switch device applicable where various controlling operations required for a camera are to take place at the first stage of operation of the switch, after which the camera is then released. The device is simple in construction and is effective for a release device for a camera. Its delayed switches are subjected to a relatively constant spring force for accurate actuation so that even after prolonged use, each switch can be accurately changed-over, thus providing effective operation in practical use.

The expression "deadpoint" relating to the arcuate spring 3 means an equilibrium point at which the spring does not urge the actuating plate 5 either up or down (with reference to FIG. 4).

We claim:

1. A release switching device mounted on a camera body, particularly for a motion picture camera, which is actuated in response to actuation of release initiating means:

a switching member (2) rotatable about an axis fixed on said camera body and interlocked with said release initiating means (124);

first switching means (11) having a plurality of electric contacts and directly switched by said switching member;

second switching means (53A,B; 52A,B) having a plurality of electric contacts and shiftable change-over actuating means (5) at one end thereof, said second switching means being actuated in response to shifting movement of said change-over actuating means, restoring means ($5_1$) for urging said second switching means to one of its switching conditions, said restoring means being in the form of a plate spring fixed on said body at one end thereof and being engageable, at the other end thereof, with said change-over actuating means (5) and disposed perpendicularly to said change-over actuating means; and resilient means (3) in the form of an arcuate leaf spring, said resilient means being held in engagement with said switching member at one end thereof, and being held in engagement, at the other end, with said change-over actuating means, said resilient means being so disposed with respect to said switching member that displacement of said switching member moves said resilient means through an equilibrium condition of said resilient means between an energy charging condition and an energy discharging condition of said resilient means, said resilient means being further so disposed with respect to said change-over actuating means that when said energy discharging condition the end of said resilient means engages with said change-over actuating means and displaces said change-over actuating means against the force of said restoring means to operate said second switching means, said second switching means thereby being switched with delay after the switching of said first switching means is completed by said switching member.

2. A release switching device according to claim 1, wherein one end of said switching member is engageable with a movable contact of said first switching means and said resilient means is held in engagement with a portion of said switching member between the opposite ends thereof.

3. A release switching device according to claim 1, wherein at least one pair of said contacts of said first switching means is connected to an exposure control circuit of said camera and at least one pair of said contacts of said second switching means is connected to a circuit for shutter release of said camera.

4. A release switching device according to claim 1, wherein at least one pair of said contacts of said first switching means is connected to a circuit for starting a tape recorder and at least one pair of said contacts of said second switching means is connected to a circuit for shutter release of said camera.

5. A release switching device according to claim 1, wherein at least one pair of said contacts of said first switching means is connected to a motor driving circuit for film wind-up and at least one pair of said contacts of said second switching means is connected to a circuit for shutter release of said camera.

6. A release switching device according to claim 1, further comprising:
   locking means for temporarily keeping said switching member inoperative at least while the camera shutter is open, said locking means being engageable with said switching member in response to said releasing means.

* * * * *

UNITED STATES PATENT OFFICE
CERTIFICATE OF CORRECTION

Patent No. 3825941　　　　　　　　　Dated  July 23, 1974

Inventor(s)  Inso MORIYAMA et al.

It is certified that error appears in the above-identified patent and that said Letters Patent are hereby corrected as shown below:

In column 6, line 35, (claim 1), after "when" insert the word -- in --.

Signed and sealed this 29th day of October 1974.

(SEAL)
Attest:

McCOY M. GIBSON JR.　　　　　　　　C. MARSHALL DANN
Attesting Officer　　　　　　　　　Commissioner of Patents